US008291321B2

(12) United States Patent
Matsubayashi

(10) Patent No.: US 8,291,321 B2
(45) Date of Patent: Oct. 16, 2012

(54) APPARATUS AND METHOD FOR SORTING VIDEO INPUTS IN INPUT SELECT MENU OF DISPLAY DEVICE

(75) Inventor: Koji Matsubayashi, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 443 days.

(21) Appl. No.: 12/379,822

(22) Filed: Mar. 3, 2009

(65) Prior Publication Data

US 2010/0229093 A1    Sep. 9, 2010

(51) Int. Cl.
*G06F 3/00* (2006.01)

(52) U.S. Cl. ........................................................ 715/716
(58) Field of Classification Search ................... 715/716
See application file for complete search history.

(56) References Cited

U.S. PATENT DOCUMENTS

| | | | |
|---|---|---|---|
| 6,182,287 B1 * | 1/2001 | Schneidewend et al. | 725/48 |
| 6,266,814 B1 | 7/2001 | Lemmons et al. | |
| 6,925,610 B2 | 8/2005 | Thurston et al. | |
| 6,934,917 B2 | 8/2005 | Lin | |
| 2005/0251751 A1 | 11/2005 | Feiler | |
| 2006/0212904 A1 | 9/2006 | Klarfeld et al. | |
| 2007/0009229 A1 * | 1/2007 | Liu | 386/83 |
| 2007/0047697 A1 * | 3/2007 | Drewry et al. | 379/88.13 |
| 2009/0106793 A1 * | 4/2009 | Tecot et al. | 725/38 |

OTHER PUBLICATIONS

Anna L. Buczak et al., "Personalization: Improving Ease-of-Use, Trust and Accuracy of a TV Show Recommender", Philips Research USA, Briarcliff Manor, NY (10 pages).

* cited by examiner

*Primary Examiner* — Alvin Tan
*Assistant Examiner* — Rinna Yi
(74) *Attorney, Agent, or Firm* — Haverstock & Owens LLP

(57) ABSTRACT

A display device has a plurality of video inputs and a video selection switch for switching between video inputs based on user inputted commands. An input select menu containing a list of the available video inputs can be displayed on the device. A remote control or input key is used to retrieve the input select menu and enter commands. The list of video inputs can be sorted in the input select menu using an automatic sorting function or a manual sorting function. A storage device keeps track of the number of times each video input is selected. The automatic sorting function uses the information in the storage device and a sorting algorithm to sort the list of video inputs in order of most frequently used to least frequently used. The manual sort function can be used to manually move the video inputs up or down in the input select menu.

19 Claims, 5 Drawing Sheets

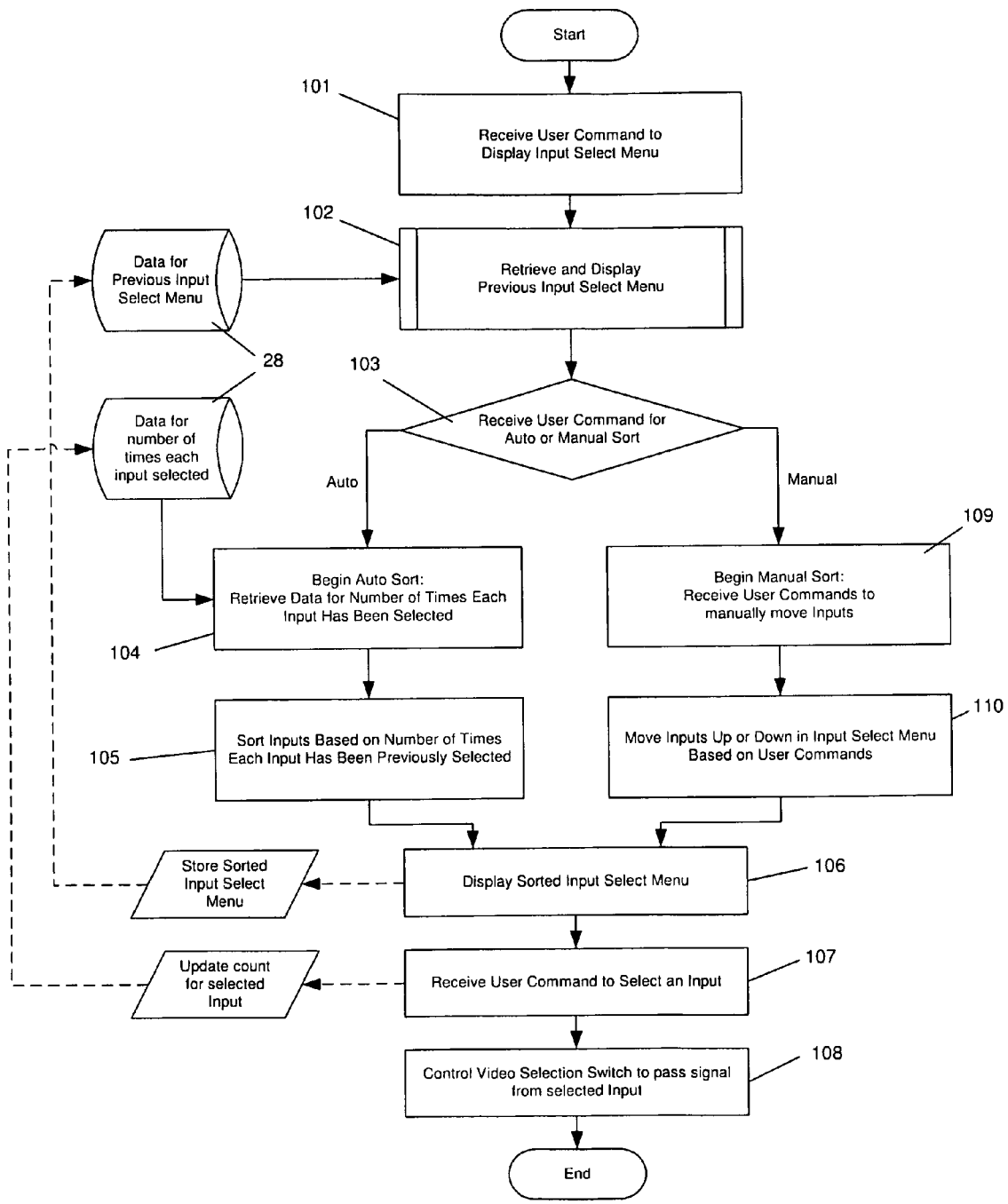

APPARATUS AND METHOD FOR SORTING VIDEO INPUTS IN INPUT SELECT MENU OF DISPLAY DEVICE

BACKGROUND OF THE INVENTION

1. Field of the Invention

This application relates generally to displaying video information, and more particularly to displaying an input select menu containing a list of video inputs available to a display device.

2. Description of the Related Art

Modern televisions, video projectors and other display devices typically have graphical user interfaces that can be displayed and navigated through using a remote control device or an input key. Such interfaces can be displayed on the display devices and used to establish various settings for the display devices, such as color, aspect ratio, picture quality and video input.

Display devices typically have a plurality of video input plugs for receiving video signals from a variety of different video sources, including game consoles, set-top boxes, DVD players, VCRs, DVRs, PCs, and memory cards. A video selection switch operated by user inputted commands is used to switch between the various video inputs. A conventional graphical user interface associated with the video selection switch uses a static list of video inputs corresponding to a prearranged order of the video input plugs on the display device.

While conventional display devices allow users to select from among a plurality of video inputs, they do not provide the most efficient interface for users to select commonly used video inputs.

SUMMARY OF THE INVENTION

In accordance with the present invention, methods and apparatus provide an interface with an input select menu containing a list of video inputs that allow an efficient selection of the most frequently used video inputs. The display device has a plurality of video input plugs and a video selection switch for switching between the video inputs based on commands inputted by a user through a graphical user interface. The interface includes an input select menu containing a list of the available video inputs. A remote control or input key is used to retrieve the input select menu and to enter commands into the interface. To promote efficiency, the list of video inputs can be sorted in the input select menu using an automatic sorting function or a manual sorting function. A storage device keeps track of the number of times each video input is selected. The automatic sorting function uses the information in the storage device and a sorting algorithm to sort the list of video inputs in order of most frequently used to least frequently used. The manual sort function can be used to manually move the video inputs up or down in the input select menu.

According to one aspect of the invention, a method for displaying information corresponding to video inputs for a display device is provided, comprising: displaying an input select menu containing a list of video inputs available to the display device; and sorting the list of video inputs to change the order of the video inputs in the input select menu. In one embodiment, the list of video inputs are sorted automatically in order of most frequently used to least frequently used on the input select menu.

According to another aspect of the invention, an apparatus for displaying information corresponding to video inputs for a display device is provided, comprising: a display device for displaying an input select menu containing a list of video inputs available to the display device; and a control unit for sorting the list of video inputs to change the order of the video inputs in the input select menu displayed on the display device.

According to another aspect of the invention, an apparatus for displaying video content from a plurality of video inputs is provided, comprising: a video selection switch for switching between a plurality of video inputs based on user inputted commands; a display device connected to the video selection switch; and a control unit for causing an input select menu containing a list of the video inputs to be displayed by the display device. A storage device is provided for storing data corresponding to previous selections of the video inputs. The control unit has a sorting algorithm for sorting the list of video inputs based on previous selections of the video inputs. The sorting algorithm places the video inputs in the input select menu in order of most frequently used to least frequently used.

BRIEF DESCRIPTION OF THE DRAWINGS

These and other more detailed and specific features of the present invention are more fully disclosed in the following specification, reference being had to the accompanying drawings, in which:

FIG. 5 is a flow chart illustrating an embodiment of a method for displaying an input select menu and for sorting a list of video inputs contained in the input select menu.

DETAILED DESCRIPTION OF THE INVENTION

A display device 10 having an input select menu and a method for rearranging the input select menu according to the present invention will now be described in detail with reference to FIGS. 1 to 5 of the accompanying drawings.

It should be noted that certain embodiments of the present invention described herein may be used with a television or a video projector. However, the ordinarily skilled artisan will recognize that other display devices may utilize the method and apparatus of the present invention. Furthermore, in the following description, for purposes of explanation, numerous details are set forth, such as flowcharts and system configurations, in order to provide an understanding of an embodiment of the present invention. However, it will be apparent to one skilled in the art that these specific details are not required in order to practice the present invention.

Figure 1:
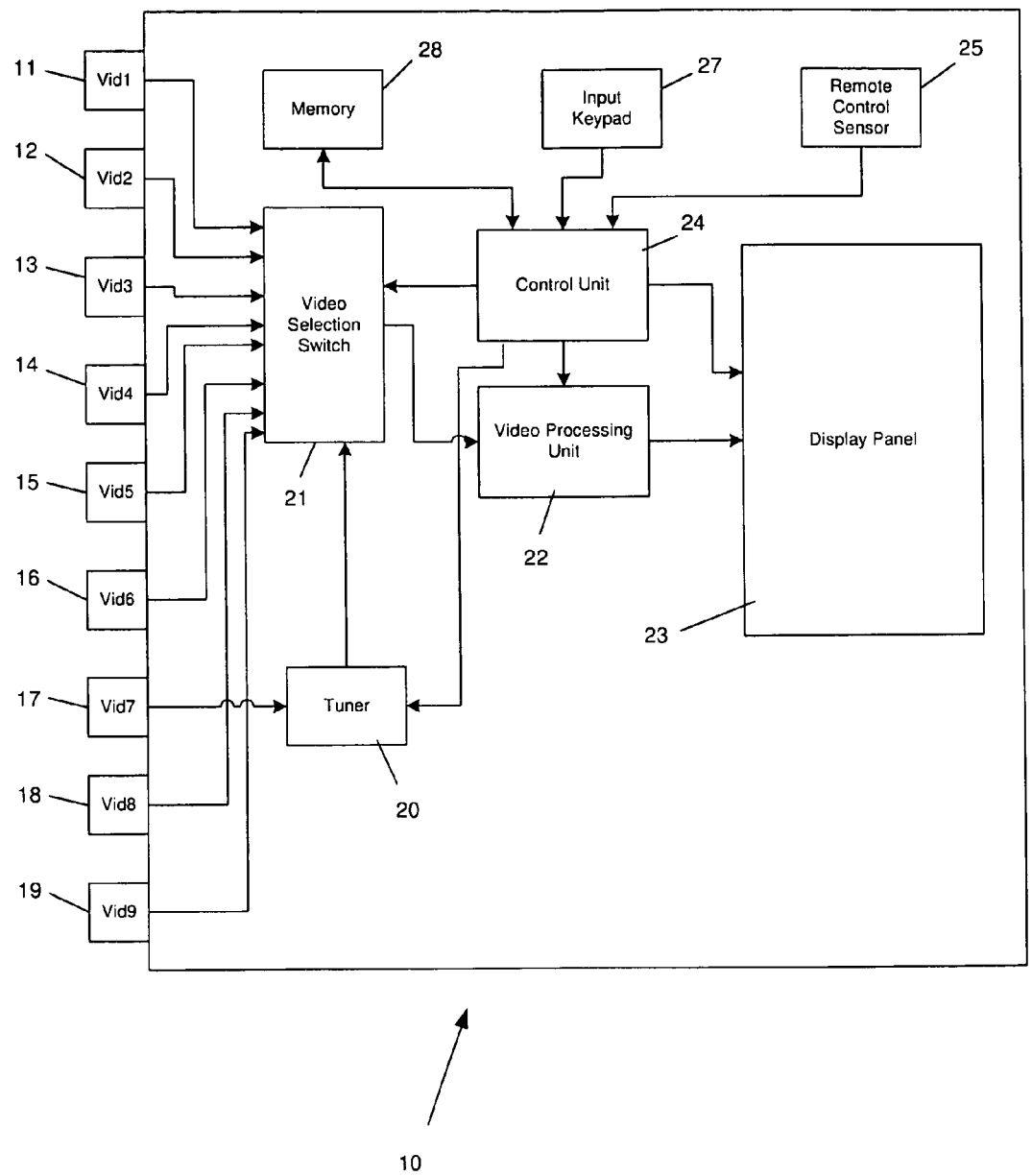
FIG. 1 is a block diagram illustrating a display device having a plurality of video inputs and including a control unit and storage device for sorting a list of video inputs in an input select menu.

A display device 10 shown in FIG. 1 includes a plurality of video input plugs 11-19 for receiving video signals from a plurality of different video sources, such as game consoles, set-top boxes, DVD players, VCRs, DVRs, PCs, and memory cards. Any variety and combination of types of inputs may correspond to the input plugs, including S-video, HDMI, RCA, coaxial, component, SVGA, etc.

The display device 10 may include an internal tuner 20 internally for selecting channels and for accommodating a rendering of control interfaces in conjunction with the control unit and the video processing unit, and thus will not require connection through one of the video input plugs 11-19. Alternatively, signals for the conventional television tuner 20 can be connected through one of the video input plugs 17 for selecting channels from a TV signal for display on the display device 10.

Each of the video input plugs 11-19 is connected as an input to a video selection switch 21. An output of the video selection switch 21 is connected to a video processing unit 22 containing conventional circuitry for processing the video signal and displaying the video content on a display panel 23 or projecting the video content in a known manner.

A control unit 24 is provided for controlling the video selection switch 21 to select a desired one of the video input plugs 11-19. The video signal from the selected video input plug 11-19 is output from the video selection switch 21 to the video processing unit 22.

Although the video processing unit 22 and the control unit 24 are shown as separate items, it is noted that these functions may be commonly provided by a single processing unit that controls the selection of inputs, the corresponding rendering of interfaces for conveying and receiving inputs, and the display of video content. It is also noted that certain display device 10 features, such as audio components, are also included in the typical display device 10 but need not be illustrated and described for an understanding of this embodiment.

Figure 2:
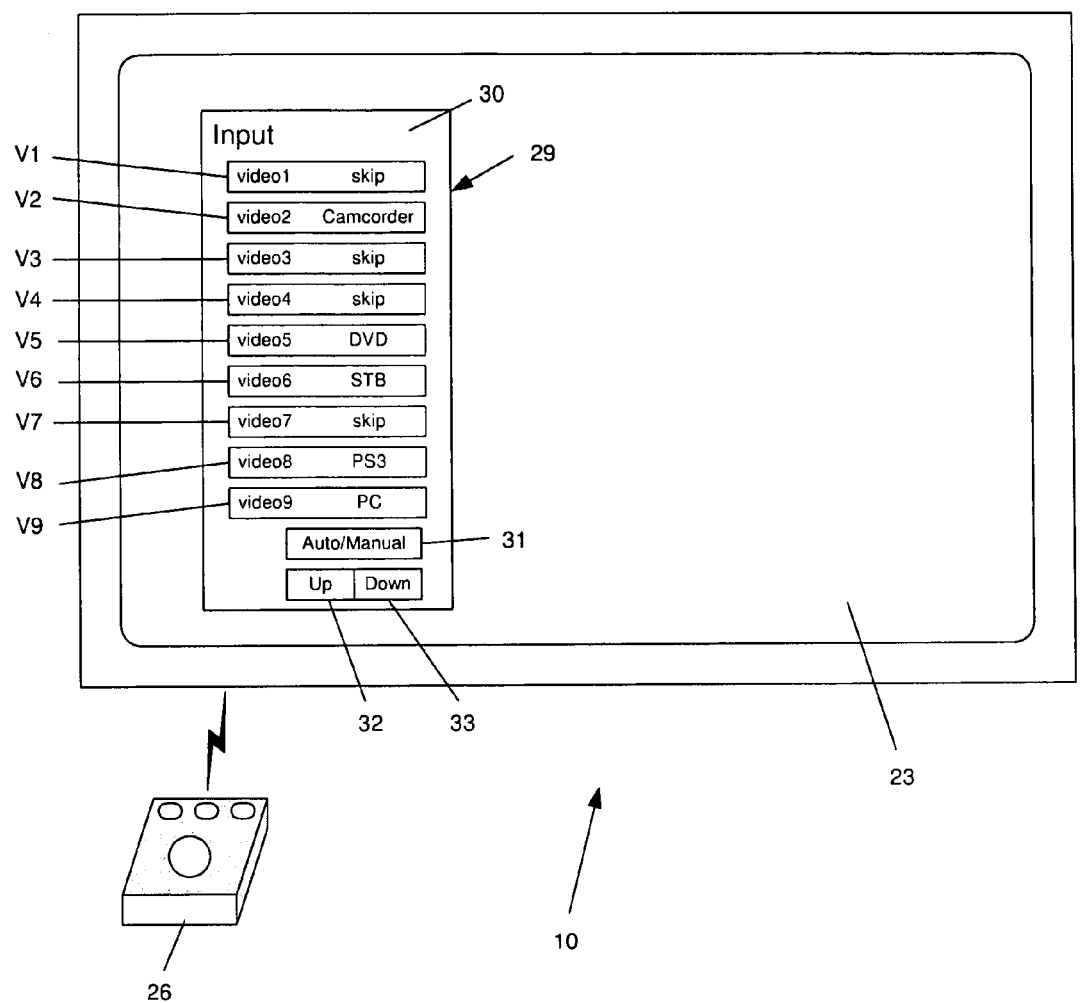
FIG. 2 is a schematic diagram illustrating a display device having an input select menu shown on a graphical user interface and a remote control unit for entering commands into the interface.

A remote control sensor 25, such as a light sensitive unit, is provided to receive user inputted commands from a remote control 26 (see FIG. 2). An input keypad 27 can also be provided on the device 10 to receive user inputted commands. The user inputted commands from the remote control sensor 25 and/or the input keypad 27 are received by the control unit 24 and can be used to navigate through graphical user interfaces displayed on the display panel 23 to establish various settings for the display device 10, including the selection of one of the video input plugs 11-19. A memory 28 or other storage device is associated with the control unit 24 to store information about the settings and the previous operation of the display device 10.

The display device 10 is illustrated in FIG. 2 with a graphical user interface 29 containing an input select menu 30 with a list of available video inputs V1-V9 for the device. The video inputs V1-V9 contained in the input select menu 30 correspond to the video input plugs 11-19 on the device 10, which can be connected to various video sources, such as a camcorder, DVD player, set-top box, game console, PC, and so forth. The video inputs V1-V9 in the input select menu 30 also include video input plugs V1, V3, V4, V7 that are available to be used but not currently connected to any video sources. The remote control unit 26 can be used to navigate the graphical user interface 29 and select a desired one of the video inputs V1-V9 to be displayed on the display panel 23.

In FIG. 2, the list of video inputs V1-V9 is arranged in a predetermined order set by default at the time of manufacture. As can be seen, the video inputs V1-V9 are not arranged in an order that corresponds with the frequency each video input is used. Instead, the unused video inputs V1, V3, V4, V7 are interspersed among the used video inputs V2, V5, V6, V8, V9, and the used video inputs are not arranged in any particular order based on previous use.

The graphical user interface 30 allows a user to sort the video inputs V1-V9 in the list using either an automatic sorting function or a manual sorting function. An AUTO/MANUAL command 31 in the graphical user interface can be used to select the desired sorting function.

Figure 3:
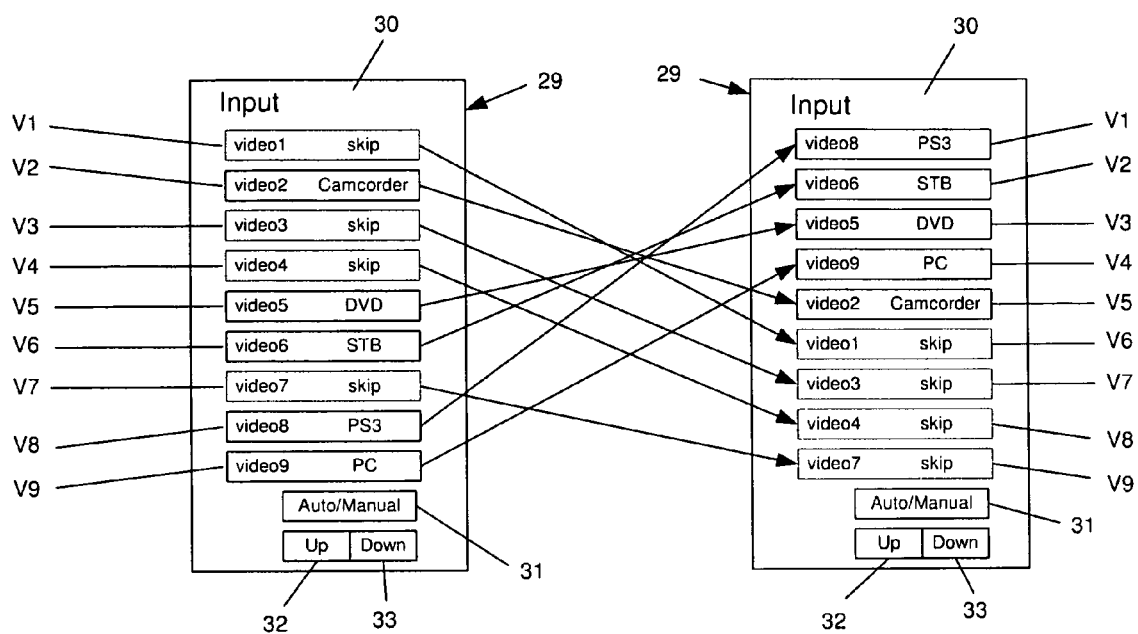
FIG. 3 is a schematic diagram illustrating a sorting function for rearranging the list of video inputs in the input select menu.

The automatic sorting function uses an algorithm in the control unit 24 for sorting the list of video inputs V1-V9 to change the order of the video inputs displayed on the graphical user interface 29. FIG. 3 illustrates how the list of video inputs V1-V9 is rearranged by the sorting algorithm so that the video inputs V8, V6, V5, V9, V2 used most frequently are moved to the top of the list, and the video inputs V1, V3, V4, V7 that are used infrequently or not at all are moved to the bottom of the list. The rearranged list of video inputs V1-V9 has the video inputs V8, V6, V5, V9, V2 arranged in order of most frequently used to least frequently used, with the unused video inputs V1, V3, V4, V7 placed at the bottom of the list.

The manual sorting function uses UP and DOWN commands 32, 33 on the graphical user interface 29 to move the video inputs V1-V9 up or down in the listing of the input select menu 30. For example, a user can select the video input V8 corresponding to the game console, and then enter the UP command 32 a desired number of times to move the video input V8 upward in the menu listing 30.

Figure 4:
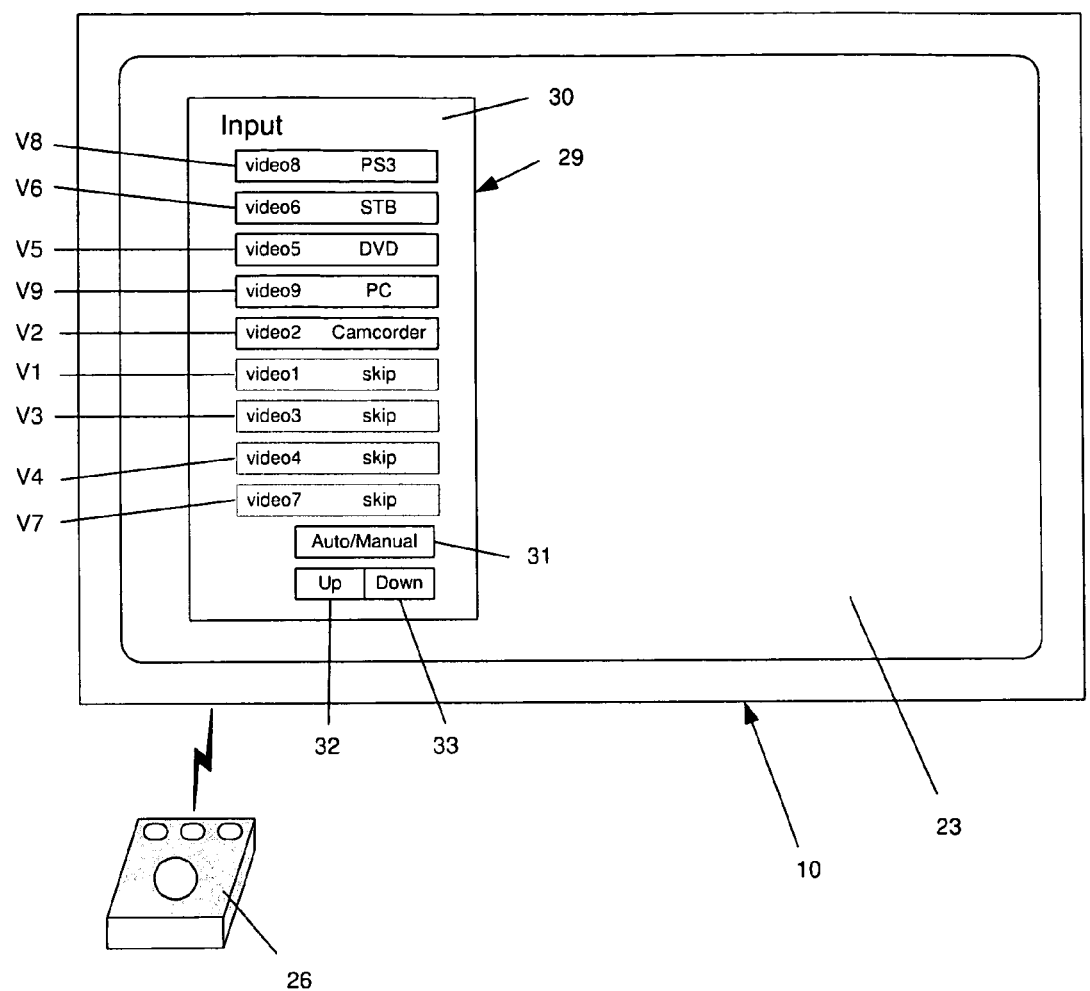
FIG. 4 is a schematic diagram, similar to FIG. 1, illustrating the sorted list of video inputs in the input select menu.

In FIG. 4, the list of video inputs V1-V9 has been rearranged by one of the sorting functions so that the video inputs V1-V9 are arranged in order of most frequently used V8 to least frequently used V2. The unused video inputs V1, V3, V4, V7 are moved to the bottom of the list. The video inputs V1-V9 are thus arranged in an order that allows more efficient and intuitive use of the device 10 by a user. A command can also be input by the remote control unit 26 to the display device 10 to select a desired one of the video inputs V1-V9 to be used. The rearranged order of the input select menu 30 is stored in the memory 28 of the display device 10 so that it will be displayed the next time the input select menu 30 is retrieved by the graphical user interface 29.

The flowchart of FIG. 5 illustrates an embodiment of displaying and sorting an input select menu 30 according to the invention. In step 101, a user command is input into the remote control 26 or keypad 27 and received by the display device 10 to display the input select menu 30. The control unit 24 is then operated in step 102 to retrieve the last input select menu 30 from the memory 28 from a previous use of the device 10, or from the default menu stored in the memory 28 at the time of manufacture.

The graphical user interface 29 on which the input select menu 30 is displayed then gives the user an option in step 103 to either automatically or manually sort the list of video inputs V1-V9 in the input select menu 30. If the automatic sorting function is selected using command 31, the process moves to step 104 and retrieves data from the memory 28 corresponding to the number of times each video input V1-V9 has been selected in the past. The control unit 24 then sorts the video inputs V1-V9 in step 105 based on the number of times each input has been previously selected so that the video inputs V1-V9 are arranged on the input select menu 30 in order of most frequently used to least frequently used. The rearranged input select menu 30 is then displayed on the display panel 23 in step 106, and the input select menu 30 is stored in the memory 28 for use in the graphical user interface 29 until another sorting takes place.

The user can then enter a command in step 107 to select one of the video inputs V1-V9 for use by the display device 10. The selection is stored in the memory 28, for example, by updating a running count for the selected video input. The video selection switch 21 is controlled by the control unit 24 in step 108 to output the video signal from the selected video input V1-V9 to the video processing unit 22 and the display panel 23.

If the manual sorting function is selected using command 31 in step 103, then the process moves to step 109 and allows user commands to be manually input into the graphical user interface 29 to rearrange the list of video inputs V1-V9 in the input select menu 30. The video inputs V1-V9 are moved up or down in the input select menu 30 in step 110 based on the user inputted commands 32, 33. The process then moves to steps 106 to 108 as explained above.

The period within which automatic sorting takes place may be variously indicated. For example, it may be automatically initiated by default and occur until there is a manual sorting to change the ordering of the video inputs. Once the manual sorting is completed and confirmed (such as by exiting the relevant control interface) the ordering of the video inputs is reset and the sorting is thereafter automatically updated based upon frequency of use of the video inputs. Alternatively, the manual sort may be maintained in a static state through user input, wherein the manual sorting is maintained until there is, at some point in time, an indication that the user would like to initiate automatic ordering. Following such an indication, the ordering of the video inputs can proceed according to the automatic updating, commencing from the manually sorted state.

In another alternative, a combination of fixed manual placement and automatic sorting may be implemented, wherein the user may fix certain of the video inputs at desired place(s) in the ordered listing, and automatic updating consistent with frequency of use dictates the remainder of video input placements in the sorting of the video inputs.

Additionally, it is noted that criteria other than frequency of use may dictate the automatic ordering. For example, although the automatic sorting algorithm described above uses the number of previous selections of each video input V1-V9 to determine the order of sorting, the ordering can be based upon a tracking and sorting of the list of video inputs based on the length of time each video input has been used previously within the relevant time frame. Additionally, a combination of frequency and length of use may be implemented.

Although the present invention has been described in considerable detail with reference to certain embodiments thereof, other embodiments are possible. A myriad of other alternatives may also be provided without departing from the scope of the present invention (e.g., different sorting algorithms, different user interfaces, and so forth). Other embodiments will become apparent to the ordinarily skilled artisan once instructed according to the present invention. Therefore, the spirit and scope of the appended claims should not be limited to the description of the embodiments contained herein.

What is claimed is:

1. A method for displaying information corresponding to video inputs for a display device, the method comprising:
   displaying an input select menu of a graphical user interface containing an up button, a down button, and a list of video inputs available to the display device based on a variable ordering of the list of video inputs,
   wherein the variable ordering is based on
      a manual ordering that moves the video inputs in response to command signals generated from the up and down buttons and
      an automatic ordering that uses a combination of a frequency of use and a length time in use for each of the video inputs over a variously indicated period;
   wherein the variable ordering is further based on a combination of fixed manual placement, which inserts a specific video input from the list of video inputs in a desired place, and the automatic ordering, which dictates the variable ordering of a remainder of video inputs;
   determining the variable ordering of the list of video inputs selectively based on the manual ordering and the automatic ordering;
   resetting the variable ordering list of video inputs upon subsequent detection of the manual ordering or the automatic ordering; and
   automatically updating the variable ordering based upon the subsequent detection using data corresponding to the frequency of use and the length of time in use for each of the video inputs over the variously indicated period.

2. The method of claim 1, further comprising receiving a selection command that selects a video input from the input select menu, and data corresponding to frequency of use of the video input from the input select menu has been selected by the selection command.

3. The method of claim 2, wherein the automatic ordering includes placing a highest used video input at the top of the input select menu.

4. The method of claim 2, wherein automatic ordering includes placing the video inputs in order of a highest used to a lowest used on the input select menu.

5. The method of claim 1, wherein the manual ordering includes receiving a move command that moves the video inputs up or down in the input select menu.

6. The method of claim 1, further comprising receiving a selection command that selects a video input from the input select menu, and controlling a video selection switch to pass a signal from a selected video input to an image processor of the display device.

7. The method of claim 1, further comprising:
   storing data from the manual ordering;
   receiving an automatic ordering command; and
   ordering list of the video inputs according to the automatic ordering commencing from the data from the manual ordering.

8. The method of claim 1, wherein the input select menu of the graphical user interface further contains an auto/manual command that when selected initiates the determining the variable ordering of the list of video inputs selectively based on the manual ordering and the automatic ordering.

9. An apparatus for displaying information corresponding to video inputs for a display device, the apparatus comprising:
   a display device for displaying an input select menu of a graphical user interface containing, an up button, a down button, and a list of video inputs available to the display device;
   a storage device for storing data corresponding to previous selections of the video inputs; and
   a control unit for maintaining the list of video inputs according to a variable ordering, for providing a manual sort subroutine for manually moving the video inputs up or down in the input select menu based on move commands generated from the up and down buttons, and for providing an automatic sort subroutine that uses an algorithm for sorting the list of video inputs based on a combination of a frequency of use and a length of time in use for each of the video inputs over a variously indicated period,
   wherein the variable ordering is based on
   a manual ordering that moves the video inputs in response to command signals generated from the up and down buttons and an automatic ordering that uses a combination of a frequency of use and a length of time in use for each of the video inputs over a variously indicated period;
wherein the variable ordering is further based on a combination of fixed manual placement, which inserts a specific video input from the list of video inputs in a desired place, and the automatic ordering, which dictates the variable ordering of a remainder of video inputs;
wherein maintaining the list of video inputs according to the variable ordering includes:
sorting the list of video inputs based on the manual ordering and the automatic ordering, and resetting the list of video inputs when the manual sort subroutine or automatic sort subroutine is initiated and sorting the list of video inputs based upon the frequency of use and the length of time in use for each of the video inputs over the variously indicated period.

10. The apparatus of claim 9, wherein the display device comprises a plurality of video inputs, and a video selection switch for switching between said video inputs based on user inputted commands received by the display device.

11. The apparatus of claim 9, wherein the algorithm places the most frequently used video input at the top of the list of video inputs in the input select menu.

12. The apparatus of claim 9, wherein the algorithm places the video inputs in order of most frequently used to least frequently used in the list of video inputs in the input select menu.

13. The apparatus of claim 9, wherein the plurality of video inputs comprises a plurality of video inputs selected from a group consisting of: game console, set-top box, DVD player, VCR, DVR, PC, and memory card.

14. The apparatus of claim 9, wherein said control unit further provides an initiated automatic ordering function where the automatic ordering commences from a manual ordering data stored on the storage device.

15. The apparatus of claim 9, wherein the input select menu of the graphical user interface further contains an auto/manual command that when selected initiates sorting the list of video inputs.

16. Apparatus for displaying video content from a plurality of video inputs, comprising:
a video selection switch for switching between a pluralities of video inputs based on user inputted commands;
a display device connected to the video selection switch;
a storage device for storing data corresponding to previous selections of the video inputs; and
a control unit for causing a graphical user interface including an input select menu containing an up button, a down button, and a list of video inputs to be displayed by the display device based on a variable ordering, the control unit comprising a means for determining the variable ordering of the list of video inputs based on data corresponding to a combination of a frequency of use and a length of time in use for each of the video inputs over a variously indicated period,
wherein the variable ordering is based on
a manual ordering that moves the video inputs in response to command signals generated from the up and down buttons and
an automatic ordering that uses a combination of a frequency of use and a length of time in use for each of the video inputs over a variously indicated period;
wherein the variable ordering is further based on a combination of fixed manual placement, which inserts a specific video input from the list of video inputs in a desired place, and the automatic ordering, which dictates the variable ordering of a remainder of video inputs;
wherein the control unit resets the data corresponding to previous selections of the video inputs when the manual ordering or the automatic ordering is initiated,
a means for automatically determining a subsequent variable ordering based upon data corresponding to previous selections of the video inputs since the prior reset.

17. The apparatus of claim 16, wherein the algorithm places the video inputs in order of most frequently used to least frequently used in the list of video inputs in the input select menu.

18. The apparatus of claim 16, wherein said control unit further comprises:
a means for initiating the automatic ordering commencing from a manual ordering data stored on the storage device.

19. The apparatus of claim 16, wherein the input select menu of the graphical user interface further contains an auto/manual command that when selected initiates determining the variable ordering by the means for determining the variable ordering of the list of video inputs.

* * * * *